United States Patent [19]
James

[11] 3,790,885
[45] Feb. 5, 1974

[54] SERIAL TEST PATTERNS FOR MOSFET TESTING

[75] Inventor: Randell Leland James, Austin, Tex.

[73] Assignee: International Business Machines Corporation, Armonk, N.Y.

[22] Filed: Mar. 27, 1972

[21] Appl. No.: 238,268

[52] U.S. Cl............................................. 324/73 R
[51] Int. Cl............................................. G01r 15/12
[58] Field of Search........................... 324/73 R, 51

[56] References Cited
UNITED STATES PATENTS
3,590,378  6/1971  Kassabgi........................... 324/73 R
3,582,633  6/1971  Webb................................. 324/73 R OTHER PUBLICATIONS
Williams, M. J. Y, "Enhancing Testability of Large-Scale Integrated Circuits Via Test Points and Additional Logic" Tech. Report No. 4602-1, Stanford Electronics Lab., Sept. 1970 TK7874.S73

Primary Examiner—Alfred E. Smith
Assistant Examiner—Ernest F. Karlsen
Attorney, Agent, or Firm—John L. Jackson

[57] ABSTRACT

A technique of decreasing the number of test patterns required to test a MOSFET module and/or provide the ability to test elements on the module which can not be tested by conventional test techniques. Conventionally, test patterns are applied to the input pins of a MOSFET module and the output monitored at the output pins of the module. Interwoven with the normal test pattern testing is the application of a serial test pattern to selected elements on the module. The serial test pattern is applied to a single input pin on the module and a serial test pattern is stored in a shift register which is on the module. Each of the stages of the shift register are used to control or monitor an element or point which may be otherwise inaccessible or untestable and the shift register is also utilized in an output mode to provide an indication serially on a single output pin as to the functioning of the points accessed on the module. The sequence then is to input onto a single input pin a serial test pattern for testing, controlling or monitoring various elements or nets on the module; reload the shift register in accordance with the test results; and then serially shift the contents of the shift register out onto the single output pin while monitoring this output to determine whether the elements or nets are functioning properly. In addition, while the serial test pattern is applied the output appearing at the output pins of the module may be monitored.

9 Claims, 3 Drawing Figures

SERIAL TEST PATTERNS FOR MOSFET TESTING

BACKGROUND OF THE INVENTION

1. Field of Invention

This invention relates to the testing of integrated circuits in general and more particularly to a technique of testing in which a portion of an integrated circuit such as a MOSFET module is dedicated for testing purposes such that a test pattern can be entered into the dedicated portion on the module and then following testing the contents of the dedicated portion can be monitored to determine whether the tested elements are functioning properly.

2. Description of the Prior Art

Testing of electronic devices is necessary to insure that the devices reach a predetermined level of quality. The quality level is chosen so that machines can be assembled with a certain confidence that they will operate. If the electronic devices are not fully tested, then the final product cannot be produced with confidence.

Testing of large scale integrated devices (LSI) such as MOSFET modules is complicated by the fact that there is a limited number of accessible test points. These test points are, effectively, in the form of functional input and output pins. The LSI packages normally have about 50 pins due to mechanical problems of tolerance and stress. While the number of pins is limited, the number of circuits on the modules or chips is increasing due to better processing techniques which allow greater density as well as larger chip size. On present day modules it is not uncommon to have over two thousand total fault points to test. For most applications it has been determined that at least ninety percent of the possible faults should be tested to insure good modules. The degree of difficulty in testing the devices depends on the type of logic employed. It has been found that a requirement of five thousand test patterns is not uncommon to reach the eighty-five percent level and several thousand more patterns are required to obtain ninety percent testability. Approximately five man weeks are required to generate the patterns to obtain 90 percent testability on the more difficult modules. The above statement relative to five thousand patterns is applicable to modules or chips 160 by 160 mils and therefore it can be appreciated that, as is planned, when 250 by 250 mil chips are available which will allow an increase to 2,000 logic cells, there will be a significant compounding of the testing problem. This is an increase of about five times the logic cells placed on typical present day chips. The amount of time required to test these larger devices will not be five times greater but will be significantly greater than is required at present.

The test patterns, as above indicated, at present for testing a module are generated from logic pages. The test patterns are applied to the input pins and known patterns are expected on the output pins. If an output pattern is correct, then it is known that certain logic blocks in the device are correct or functioning properly. Different patterns are applied to the device which will test different logic blocks. However, as is obvious certain of the nets or logic blocks can not be tested with present day techniques. It is therefore obvious that some technique is required for reducing the number of test patterns required and/or providing accessibility to nonaccessible elements on an LSI device.

BRIEF SUMMARY OF THE INVENTION

A technique of decreasing the number of test patterns required to test an LSI device such as a MOSFET module and/or provide the ability to test elements on the module which can not be tested by conventional test techniques. Conventionally, test patterns are applied to the input pins of a MOSFET module and the output monitored at the output pins of the module. In the present invention, interwoven with the normal test pattern testing is the application of a serial test pattern to selected elements of the module. In the preferred embodiment the serial test pattern is applied to a single input pin on the module and a serial test pattern is stored in a shift register which is on the module. Each of the stages of the shift register are used to control or monitor an element or point which may be otherwise inaccessible or untestable and the shift register is also utilized in an output mode to provide an indication serially on a single output pin as to the functioning of the points tested accessed on the module. The sequence then is to input onto a single input pin a serial test pattern for testing, controlling or monitoring various elements or nets on the module; reload the shift register in accordance with the test results; and then serially shift the contents of the shift register out onto the single output pin while monitoring this output to determine whether the elements or nets are functioning properly. Obviously, of course the functional output pins can also during application of the test pattern be monitored for testing purposes.

The logic level applied to the serial input pin is 1 or high for n bit times where n is the length of the shift register. This results in all of the stages of the shift register being loaded with 0's. The logic level applied to the serial input pin is then alternated between 0 and 1 to enter 1's and 0's into the appropriate stage of the shift register. This pattern of 1's and 0's is continuously applied for n bit times to completely load the register with the desired serial test pattern. The registers are then sampled in parallel and they are logically applied to the points on the device to be tested. Then following testing the output of the devices which are being tested are then gated to their respective associated stages of the shift register.

The results of the tests are then clocked out along or by means of the output pin and the tester will collect the serial output patterns and check them for proper levels resulting from the input test patterns. It should be noted, as above stated, that as the serial test pattern is being entered and/or applied, the normal test patterns which are entered through the functional pins may be applied and the outputs on the functional output pins monitored.

DETAILED DESCRIPTION OF THE DRAWINGS

Prior to a detailed description of the invention a brief explanation of the terminology employed is felt to be in order. In the description the terms large scale integrated (LSI) circuitry and metal oxide silicone field effect transistor (MOSFET) devices are used interchangeably even though it is recognized that a MOSFET device is a member of the family of LSI devices. This particular tact is taken since, with present technologies only FET type devices provide the physical circuit densities that present testing problems of the type that the present invention is designed to overcome.

Figure 1:
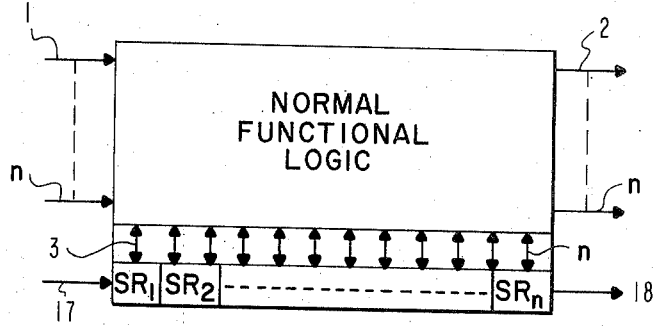
FIG. 1 is a block diagram illustrating the overall utilization of a shift register for checking elements in a logic block.

As shown in FIG. 1, the usual MOSFET chip has normal functional logic and input pins 1 through n and output pins 2 through n. The particular make-up of the logic is as required to perform the logical functions desired. As further shown in FIG. 1 there is a shift register having an input pin 17 and an output pin 18. The shift register comprises stages $SR_1$, $SR_2$, through $SR_n$. Each of the stages of the shift register is in two way communication with the normal functional logic block along lines 3 through n. As previously discussed the connections of the stages of the shift register are to the various points in the normal functional logic which are either impossible to test through application of normal test patterns to input pins 1 through n or are extremely difficult to test in that they require that a great number of test patterns be applied to the pins 1 through n. It should be further understood that even though a large number or even an unlimited number of test patterns might be applied to the normal functional logic, in certain MOSFET devices there are points which cannot be tested.

Figure 2:
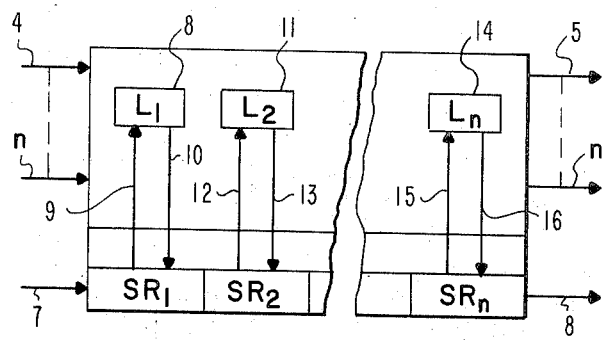
FIG. 2 is an overall block diagram illustrating a shift register utilized to check the operation of latches $L_1$ through Lhd n.

Refer next to FIG. 2 in which is shown a more detailed or specific implementation of a logic device and associated shift register similar to that of FIG. 1. In FIG. 2 the input pins to the normal functional logic are 4 through n while the output is taken from the normal functional logic along lines 5 through n. The input to the associated shift register is applied to input pin 7 and the output taken serially from pin 8. As shown the shift register is of n bits in length. Shift register stage 1 labeled $SR_1$ is in two way communication along lines 9 and 10 with a latch 8 labeled $L_1$; the second stage of the shift register is in two way communication along lines 12 and 13 with a latch labeled $L_2$ while the final or nth stage of the shift register is in two way communication along lines 15 and 16 with latch 14 labeled $L_n$. The example of latches as the devices being tested or controlled and monitored in FIG. 2 is merely for purposes of illustration and it will be understood by those skilled in the art that other types of devices could likewise be tested as will later become apparent in connection with the detailed description of FIG. 3. The description of the testing and monitoring of latches is however chosen for purposes of illustration since the latches in a MOSFET device are normally used to control sub-functions within the overall logical function. Therefore, the control and sampling of these latches gives the test engineer extensive control over the total module logic thereby facilitating testing to an extremely high degree.

Figure 3:
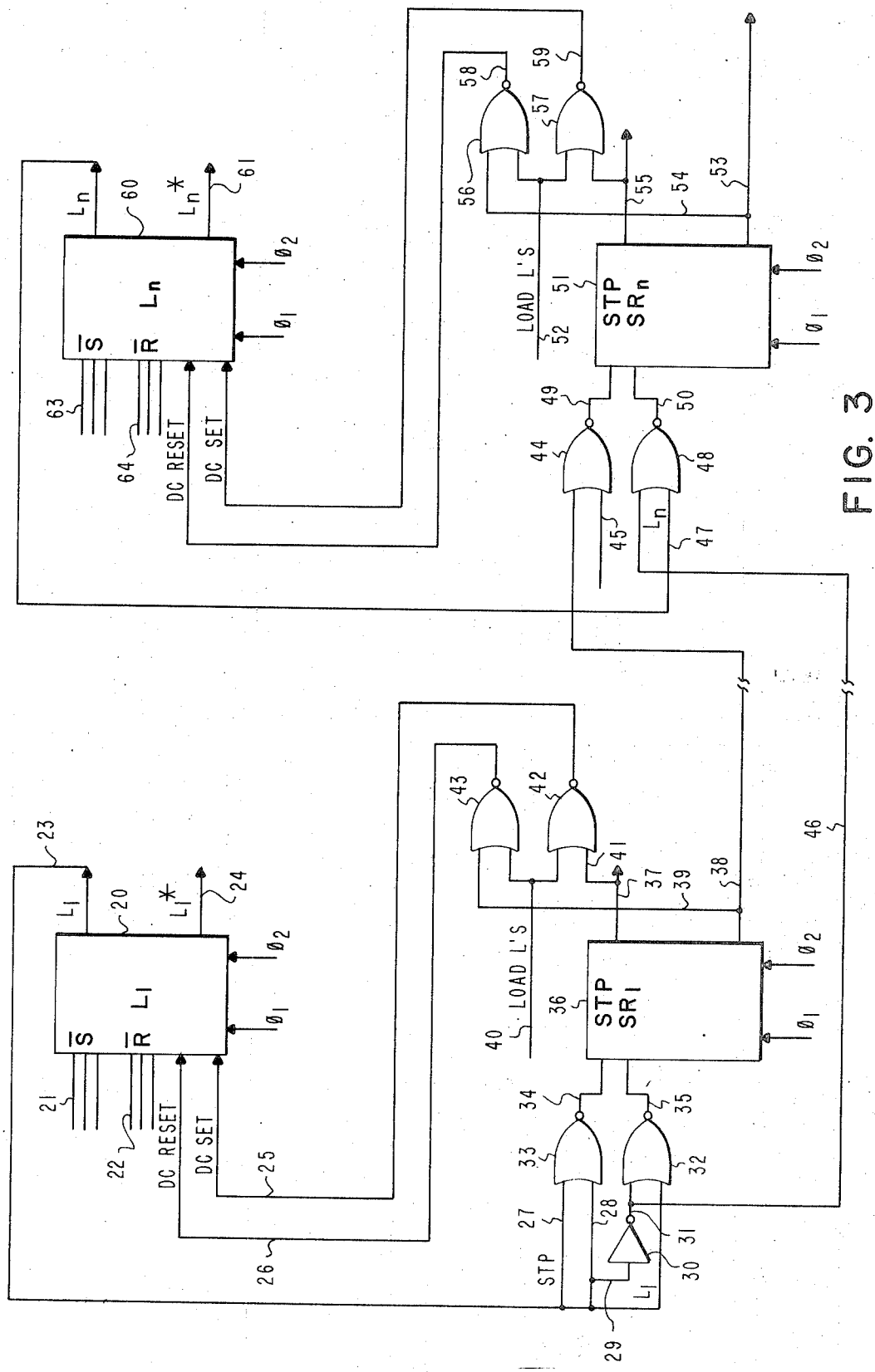
FIG. 3 is a detailed drawing of the block diagram of FIG. 2 illustrating one implementation thereof.

For a more detailed description of the subject invention refer next to FIG. 3. The lower portion of FIG. 3 includes a shift register which as above described is on the MOSFET device while the upper portion of FIG. 3 illustrates or shows a number of latches which are to be set or reset in accordance with the pattern shifted into the shift register. As shown latch 20 labeled $L_1$ has a number of inputs to its set gate along lines 21 and a number of inputs into its reset gate along lines 22. These inputs applied along lines 21 and 22 are from the normal functional logic of the MOSFET chip and are utilized to set and reset the chip in accordance with the logical functions desired to be implemented. The output of latch 20 is applied along line 23 and thence into a NOR gate 32. NOR gate 32 also receives an input along line 31 from inverter 30 which in turn receives an input along line 29 from line 28. Line 28 is also input into NOR gate 33 which receives the serial test pattern control signals along line 27. The output of NOR gate 33 is applied along line 34 while the output of NOR gate 32 is applied along line 35 to the first stage 36 of the shift register. The particular timing utilized in the circuit of FIG. 3 will not be described but suffice it to say that at $\phi_1$ time the inputs to the shift register stages are applied while at $\phi_2$ time the input which was applied at $\phi_1$ is set into the shift register stage.

The output of the first stage of the shift register is applied along line 38 to NOR gate 44 and the same output is applied along line 39 to NOR gate 43. NOR gate 43 also receives an input along line 40 and this input along line 40 is also applied to NOR gate 42. The other input to NOR gate 42 is from the first stage 36 of the shift register along line 41. As is conventional the outputs on line 37 and line 38 of the shift register stage 36 are complimentary and the shift register stages can be loaded with 1's or 0's.

The NOR gate 42 is the set NOR gate and it is connected along line 25 to the DC set of latch 20 while NOR gate 43 is the reset NOR gate and its output is applied along line 26 to the DC reset line of latch 20. d The signal appearing on line 31 which is the output of inverter 30 is applied along line 46 to each of the lower NOR gates of each stage corresponding to NOR gate 48. That is, as shown in FIG. 3 the output along line 31 is applied along line 46 and constitutes one input to NOR gate 48. As will later be described these NOR gates serve to control communication between the latches and shift register stages. The other input to NOR gate 48 as was the case with respect to latch 20 is from latch 60 which is settable and monitored by the final shift register stage 51 for purposes of testing and control. The output of NOR gate 48 is applied along line 50 to the final stage of the shift register 51.

It will be appreciated that, while for purposes of simplicity, only two shift register stages are shown and will be described that the shift register could be of any length to test any number of elements on the MOSFET device. The other input to the final stage 51 of the shift register is from NOR gate 44 along line 49. The inputs to NOR gate 44 are from the NOT output of shift register stage 36 along line 38 and from line 45. Further, as will later be described in more detail the shift registers stages are all initialized to 0 prior to the shifting in of the various bit patterns to set the associated latches.

The output from the final shift register stage 51 is along line 53 or line 55 to the monitoring test device. Line 53 is also connected to line 54 which constitutes one input to NOR gate 56. The other input to NOR gate 56 is along line 52 which is used to control the loading or setting of the latches in accordance with contents of the various shift register stages. This line numbered 40 in the case of the first shift register stage and 52 in the case of the final shift register stage controls the loading of the contents of the shift register stages into the latches to set and reset them, again as will later be described in detail. The output of NOR gate 56 which is the reset NOR gate is applied along line 58 to the reset line of latch 60. The other input to NOR gate 57 is along line 55 from the final shift register stage 51 which as above discussed is complimentary to the output appearing on line 53. The output from NOR gate 57 is along line 59 to the set of latch 60. With respect to latches 20 and 60 if either of the DC set or reset lines go to 1 following $\phi_2$ time the latch will be set or reset regardless of the inputs applied to lines 63 and 64. That is, this is an override DC set and reset. The output from latch 60 is applied along line 47 to AND gate 48 as above described while the other output from latch 60 which is complimentary to that appearing on line 47 appears on line 61.

As previously discussed during normal operation, the test patterns are applied to lines 21 and 22 of latch 20 and 63 and 64 of line 60 and the output of the latch monitored. Again the output of the latch or latches may be applied to another circuit element on the MOSFET device in a conventional manner to accomplish the desired logical functions.

Next will be described the sequence of setting up the shift registers; entering a serial test pattern and transferring the contents of the shift register stages to the associated latches to initialize the latches to a desired state. Then there will be described the transfer of the state of the latches back to the associated shift register stage and shifting of this information out of the shift register.

Prior to a detailed description of the above operations the timing associated with FIG. 3 will be described. $\phi_1$ and $\phi_2$ inputs are shown as inputs to each of the shift register stages as well as inputs to the latches which are to be conditioned and then monitored. Also another timing signal is applied to line 40 which is a load latch signal. This signal occurs between time $\phi_2$ and time $\phi_1$. As is conventional with respect to the latches and shift registers at time $\phi_1$ data appears on the input lines to the latches and shift register stages and is set into the latches and shift register stages at time $\phi_2$. However as above indicated if either the DC set or DC reset line of the latches are brought up to a 1 or positive logical level, the latch will be set or reset in occurrence with which line is brought up following the occurrence of $\phi_2$ time.

When the shift register is to be initialized such that all of the stages contain 0's certain inputs must be applied to the lines of the shift register. There will be a 1 (high logical level) applied along line 27 which is one input to NOR gate 33. This 1 logical level causes a 0 output (low logical level) from NOR gate 33. At the same time during the initialization of the shift register, a 0 is applied to line 28 which constitutes the other input to NOR gate 33. This 0 logical level applied to line 28 passes along line 29 and is inverted in inverter 30 and appears as a 1 at the input to NOR gate 32 which in turn causes its output likewise to be 0. Thus the inputs along lines 34 and 35 to the shift register stage 36 are 0 and that stage is therefore loaded with a 0. It should be noted that if either of the inputs to the shift register stage 36 or shift register stage 51 are positive that at $\phi_2$ time a 1 would have been set into the shift register stage. However, as above discussed a 0 is loaded into a first stage of the shift register. Since stage 36 holds a 0, the output on line 37 is a 0 and the output on line 38 is the inverse or is at a positive logical level and this positive logical level is applied to NOR gate 44 which causes a 0 output on line 49 which is one of the inputs to shift register stage 51. Likewise the positive logical level on line 31 is applied along line 46 which constitutes one input to NOR gate 48 thus causing its output on line 50 to be at a low or 0 logical level. The loading of the shift register stages occurs in this manner for n times where n is the length of the shift register such that all of the stages are initialized to 0.

The loading of the shift register does not affect the latches in any manner since during the loading of the shift register with 0's there is a positive logical level applied to line 40 which causes the outputs of both NOR gates 43 and 42 to be 0 thus causing the inputs along lines 25 and 26 to the set and reset of latch 20 to be at a 0 level which prevents interference with the normal operation of latch 20. The same holds true with respect to latch 60 in that during the initialization of the shift register to 0's a positive logical level is applied along line 52 which causes the output of both NOR gates 56 and 57 to apply 0 logical levels to the DC set and reset lines of latch 60 thus preventing interference with it's normal operation.

Next there will be described the loading of the various stages of the shift register with 1's or 0's in accordance with the desired test pattern. That is, whether a particular stage of the shift register holds a 1 or 0 at the time that the stages are brought into logical communication with their associated latches will determine whether their associated latches are set or reset.

As was the case when the shift register was initialized to 0 in each stage the line corresponding to lines 40 and 52 which are labeled load L's are held at a 1 logical level to isolate the shift register stages from the associated latches so that no effect on the latches will take place during the shifting of the sequence of 1's and 0's into the shift register. Further a low logical level is applied along line 28 to NOR gate 33 such that if a 0 is input onto line 27 which is connected to the serial test pattern input pin, a 1 will be output by NOR gate 33 onto line 34 such that at time $\phi_2$ a 1 is set into the first shift register stage 36. This also results in a 0 being applied to line 35 such that the associated latch can be flipping back and forth in accordance with the logical inputs to it and not affect the loading of the serial test pattern. On the other hand in the event that a 1 is applied to line 27, in accordance with the functioning of NOR gate 33, a 0 will appear on the input line 34 and a 0 will be loaded into the first shift register stage 36 at $\phi_2$ time. It will be further apparent that the 0 appearing on line 28 is inverted through inverter 30 and is applied as a positive logical level line along line 46 to NOR gate 48 to cause it to apply a 0 output on line 50 which is one of the input lines to shift register stage 51.

Assume for purposes of illustration that the first input along line 27 was, as above described a 0 such that the first shift register stage 36 is loaded with a 1, and the next input to line 27 is a 1. The 1 in shift register stage 36 must be shifted into the final shift register stage 51. The 1 logical level from shift register stage 36 appears on line 37 which is applied along line 41 to NOR gate 42. However, this has no effect on the latches since line 40 has a positive logical level which prevents or effectively isolates the latches from the shift register stages. However, when shift register stage 36 has been set to 1 there is a 0 output on line 38 and this 0 output is applied as a 1 input to NOR gate 44 which again, as previously described, has a 0 input applied to it during the loading of the shift registers. That is, each of the lines 28 and 45 and their counterparts for each of the stages of the shift registers during this time have 0 inputs applied to them. With 0 inputs applied to NOR gate 44 it outputs a 1 along line 44 and at $\phi_2$ time this 1 is set into register stage 51. At the same time the 1 which is applied to line 27 causes a 0 to be output from NOR gate 33 which results in a 0 being loaded into register stage 36 at $\phi_2$ time. Thus, at $\phi_2$ time register 36 will hold a 0 while register stage 51 will contain a 1.

The next operation which will be described will be the setting of the associated latches in accordance with the contents of the shift register stages. To load the latches or control the latches in accordance with the contents of the shift register stages, lines 40 and 52 will be dropped following $\phi_2$ time to a low logical level or a 0 level, and thus one of the NOR gates 42 or 43 will output a 1 on its respective output line. In the example given since stage 36 contains a 0 a 0 will appear on line 37 and will be input along line 41 to NOR gate 42 which will then output a 1 logical level along line 35 to set latch 20. With respect to shift register stage 51 which holds a 1, line 55 will be at a positive logical level and therefore NOR gate 57 will output a 0 along line 59 while a 0 will be applied along lines 53 and 54 to NOR gate 56 which in turn will output a 1 or positive logical level along line 58 to the reset of latch 60. Thus latches 20 and 60 are set in accordance with the contents of their respective or associated shift register stages.

Next the operation of monitoring the contents of the latches 20 and 60 following their reaction to inputs, if any to their normal control lines 21, 22, 63, 64) to determine their condition will be described. In this situation the contents of latches 20 and 60 are transferred back to their associated shift register stages for shifting out of the shift register. The contents of the latches could also be monitored at the functional output pins. That is the latches might be set to a certain state in order to check the operation of other logical elements between the latches and the functional output pins. To accomplish the operation of shifting or transferring back into the shift register line 28 has a positive logical level applied to it which results in an inversion through inverter 30 which results in a 0 or low logical level being applied along line 31 into NOR gate 32. Application of the 0 logical level to line 31 will enable NOR gate 32 to be controlled along line 23 from latch 20 in accordance with the contents of the latch. Since the latch in this case has been set, line 23 will be high and therefore the output from NOR gate 32 will be a 0 and thus at $\phi_2$ time a 0 will be loaded into shift register stage 36 from latch 20. On the other hand, since latch 60 has been reset line 47 will be at a 0 or low logical level and NOR gate 48 will output a 1 along line 50 into shift register stage 51. Thus, following the transfer of the contents of latches 20 and 60, shift register stages 36 and 51 will hold, respectively, 0 and 1.

The final operation to be described is the shifting of the contents of the shift register stages obtained from the latches out of the shift register. At this time line 45 which constitutes an input to NOR gate 44 is brought to a 0 logical level as are all of the lines in the other shift register stages which are input to similar NOR gates. This will enable NOR gate 44 to pass a 1 in the event that the output from shift register stage 36 is a 0. However since shift register stage 36 is loaded or holds a 1 the output from NOR gate 44 will be 0 and this output will be shifted at $\phi_2$ time along line 44 and set into shift register stage 51. At the seme time the output of shift register stage 51 would have been output along line 55 or line 53 to the output pin.

Thus, all of the lines corresponding to line 45 into NOR gate 44 will be at a 0 logical level such that in the event that the preceding shift register holds a 1 the associated NOR gate can output a 1 and in this manner the contents of the shift register can be shifted out along line 55.

A technique of decreasing the number of test patterns required to test an LSI device such as a MOSFET module and/or provide the ability to test elements on the module which can not be tested by conventional test techniques. Conventionally, test patterns are applied to the input pins of a MOSFET module and the output monitored at the output pins of the module. In the present invention, interwoven with the normal test pattern testing is the application of a serial test pattern to selected elements of the module. In the preferred embodiment the serial test pattern is applied to a single input pin on the module and a serial test pattern is stored in a shift register which is on the module. Each of the stages of the shift register are used to control or monitor an element or point which may be otherwise inaccessible or untestable and the shift register is also utilized in an output mode to provide an indication serially on a single output pin as to the functioning of the points tested accessed on the module. The sequence then is to input onto a single input pin a serial test pattern for testing, controlling or monitoring various elements or nets on the module; reload the shift register in accordance with the test results; and then serially shift the contents of the shift register out onto the single output pin while monitoring this output to determine whether the elements or nets are functioning properly. Obviously, of course the functional output pins can also during application of the test pattern be monitored for testing purposes.

The logic level applied to the serial input pin is 1 or high for n bit times where n is the length of the shift register. This results in all of the stages of the shift register being loaded with 0's. The logic level applied to the serial input pin is then alternated between 0 and 1 to enter 1's and 0's into the appropriate stage of the shift register. This pattern of 1's and 0's is continuously applied for n bit times to completely load the register with the desired serial test pattern. The registers are then sampled in parallel and they are logically applied to the points on the device to be tested. Then following testing the output of the devices which are being tested are then gated to their respective associated stages of the shift register.

The results of the tests are then clocked out along or by means of the output pin and the tester will collect the serial output patterns and check them for proper levels resulting from the input test patterns. It should be noted, as above stated, that as the serial test pattern is being entered and/or applied, the normal test patterns which are entered through the functional pins may be applied and the outputs on the functional output pins monitored.

While the subject invention has been described with only a single shift register it will be apparent that the basic testing concept could be readily implemented with two shift registers; one for holding the test pattern and a second for holding the test results. Further, while in the described technique the results of the testing were transferred back from the logical elements to the register stages which controlled them, this is not necessary in that the test results could be taken from other logical points on the module.

While the invention has been particularly shown and described with reference to a particular embodiment, it will be understood by those skilled in the art that various changes in form and detail may be made without departing from the spirit and scope of the invention.

What is claimed is:

1. A method of testing a large scale integrated logical chip device having functional input and output pins in logical communication with logical elements and nets on said logical device, said method comprising:
   adding on to said logical chip device shift register storage means for holding a test pattern,
   loading a test pattern into said shift register storage means,
   applying said test pattern to selected elements on said logical chip device; and
   monitoring the results of said application of said test pattern to said selected elements.

2. The method of testing a large scale integrated logical chip device of claim 1 wherein said test pattern is serially shifted into said register.

3. The method of testing a large scale integrated logical chip device of claim 2 wherein said shift register is isolated from said selected logical elements during said serial shifting of said test pattern into said shift register.

4. The methof of testing a large scale integrated logical chip device of claim 3 wherein following said application of said test pattern to said selected logical elements a binary pattern representative of the reaction of said selected logical elements is loaded into said shift register and said binary pattern serially shifted out of said shift register.

5. The method of testing a large scale integrated logical chip device of claim 4 wherein during the shifting out of said binary pattern said shift register is logically isolated from said selected logical elements.

6. The method of testing a large scale integrated logical chip device of claim 5 wherein said test pattern is serially applied to said shift register by application to a single input pin and said binary representation is shifted out of said shift register along a single output pin.

7. The method of testing a large scale integrated logical chip device of claim 6 wherein said serial test pattern is shifted into a first shift register and said binary representation is loaded into a second shift register.

8. The method of testing a large scale integrated logical chip device of claim 6 wherein following the application of said test pattern to said selected logical elements logical test patterns are applied to said functional input pins and the resultant output appearing on said functional output pins monitored.

9. The method of testing a large scale integrated logical chip device of claim 8 wherein said shift register is initialized such that all of the stages thereof initially contain a binary 1 or a binary 0 prior to the loading of said test pattern.

* * * * *

UNITED STATES PATENT OFFICE
CERTIFICATE OF CORRECTION

Patent No. 3,790,885          Dated February 5, 1974

Inventor(s) Randell Leland James

It is certified that error appears in the above-identified patent and that said Letters Patent are hereby corrected as shown below:

Column 9, line 33, following "said", insert therefor --shift--;

Column 10, line 4, delete "methof", and insert therefor --method--.

Signed and sealed this 21st day of May 1974.

(SEAL)
Attest:

EDWARD M. FLETCHER, JR.          C. MARSHALL DANN
Attesting Officer          Commissioner of Patents